(12) United States Patent
Ming

(10) Patent No.: US 7,802,371 B2
(45) Date of Patent: *Sep. 28, 2010

(54) LEVEL WITH MAGNETIC DEVICE

(75) Inventor: Wu Dong Ming, Zhejiang (CN)

(73) Assignee: East Precision Measuring Tools Co., Ltd., Jinhua, Zhejiang Province (CN)

( * ) Notice: Subject to any disclaimer, the term of this patent is extended or adjusted under 35 U.S.C. 154(b) by 49 days.

This patent is subject to a terminal disclaimer.

(21) Appl. No.: 12/172,437

(22) Filed: Jul. 14, 2008

(65) Prior Publication Data

US 2008/0263879 A1 Oct. 30, 2008

(51) Int. Cl.
*G01C 9/26* (2006.01)

(52) U.S. Cl. .......................... 33/347; 33/379; 33/DIG. 1

(58) Field of Classification Search ................... 33/347, 33/370, 371, 379–390, DIG. 1
See application file for complete search history.

(56) References Cited

U.S. PATENT DOCUMENTS

| | | | |
|---|---|---|---|
| 3,832,782 A * | 9/1974 | Johnson et al. | ............... 33/390 |
| 4,419,833 A | 12/1983 | Wright | |
| 4,593,475 A | 6/1986 | Mayes | |
| 5,199,177 A | 4/1993 | Hutchins et al. | |
| 5,755,037 A | 5/1998 | Stevens | |
| 5,755,623 A * | 5/1998 | Mizenko | ...................... 33/384 |
| 5,940,978 A | 8/1999 | Wright et al. | |
| 6,026,581 A | 2/2000 | Gruetzmacher | |
| 6,029,360 A | 2/2000 | Koch | |
| 6,675,490 B1 | 1/2004 | Krehel et al. | |
| 7,398,600 B2 * | 7/2008 | Ming | .......................... 33/347 |
| 7,552,540 B2 * | 6/2009 | Ming | .......................... 33/347 |
| 2003/0005590 A1 | 1/2003 | Snyder | |
| 2004/0143981 A1 | 7/2004 | Krehel et al. | |
| 2008/0301957 A1 * | 12/2008 | Vernola | ...................... 33/371 |

* cited by examiner

*Primary Examiner*—G. Bradley Bennett
(74) *Attorney, Agent, or Firm*—Boyle Fredrickson, S.C.

(57) ABSTRACT

A level with magnetic device relates to a measuring instrument. That level includes a case body and a bubble cell on the case body, and it is characterized in that the cross section of the bottom of the case body, being the location of the reference plane, has a profiled shape, and furthermore by this is constituted a profiled slot on the bottom of the case body, a magnet is placed inside the profiled slot on the bottom of said case body, an elastic retaining bracket is pressed on top of the magnet, and the shapes of that elastic retaining bracket and the profiled slot are complementarily matched. That level solves the problem of instability of precision of the contemporary level with magnetic device, and it is widely applicable in the level industry.

12 Claims, 2 Drawing Sheets

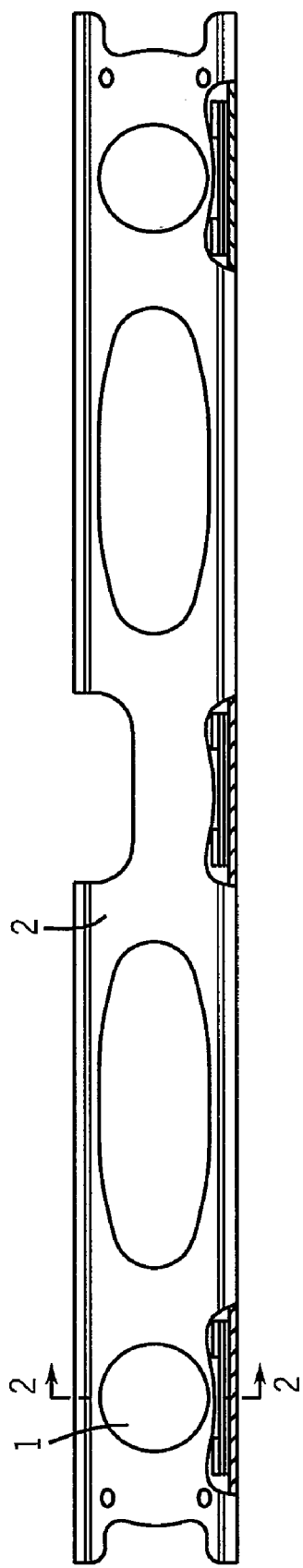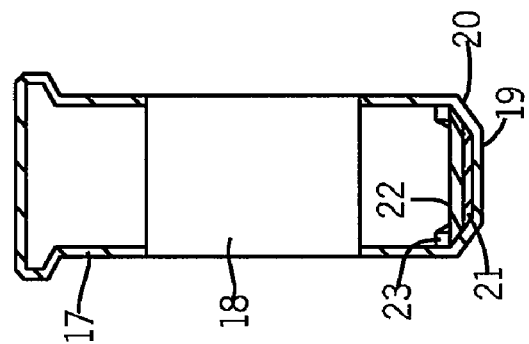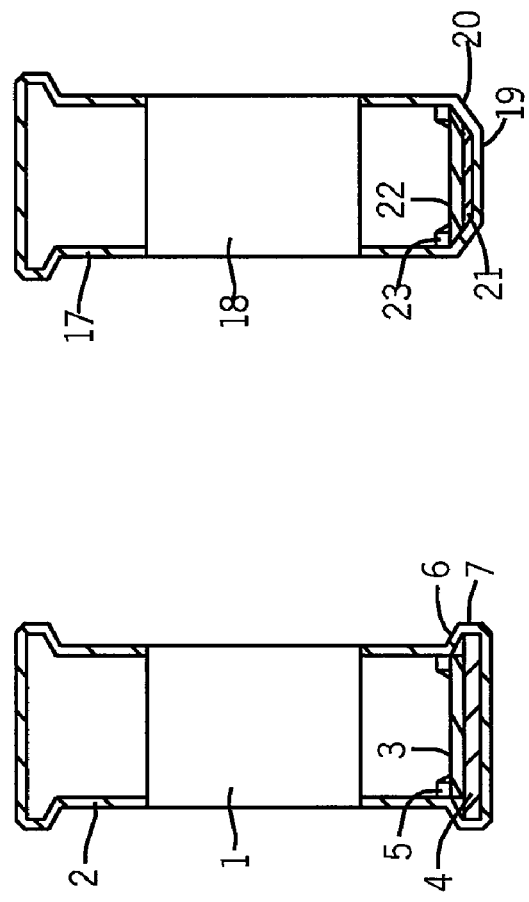

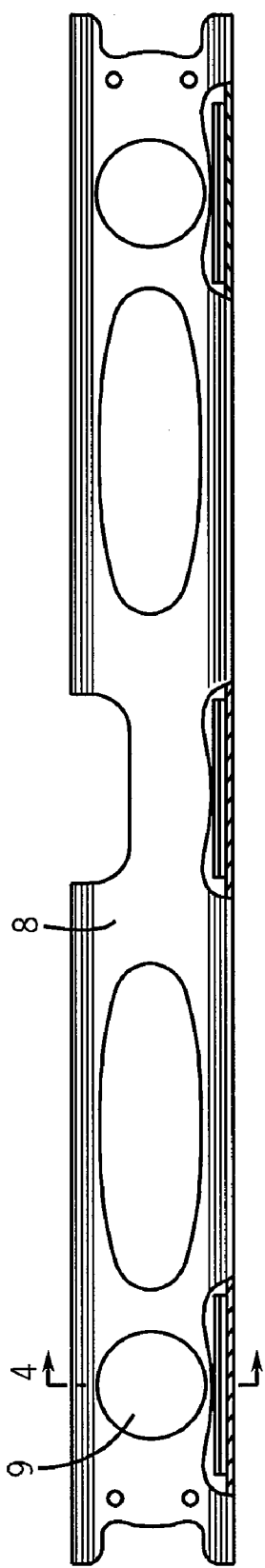
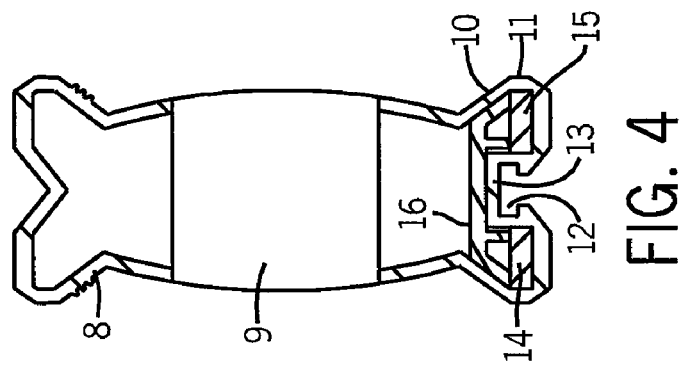

LEVEL WITH MAGNETIC DEVICE

FIELD OF THE INVENTION

The present invention is directed to a measuring instrument and more particularly, to a level having a magnetic device for magnetically coupling the level to a metallic surface.

BACKGROUND OF THE INVENTION

It is known to add a magnetic device on top of the reference plane of a level to allow the level device to be fixed to the top of a metal surface. As for magnetic devices used in levels in the contemporary market, usually several holes are punched on the reference plane of the level, the magnet and a magnetically conductive iron piece are fixed on top of a plastic piece, and then the assembly is installed inside the already punched and well-machined hole. This structure easily causes the straightness of the reference plane to be broken and influences the precision of the level, and at the same time, the externally exposed iron piece easily rusts and influences the external appearance of the level. Moreover, when the magnetic seat is installed in the wrong position, the precision of the level can be negatively affected.

SUMMARY OF THE INVENTION

The purpose of invention of the present utility model is to overcome the above-mentioned flaws, and to publish a level with magnetic device that makes the precision of the level more stable and the external appearance more pleasing to the eye.

The technological scheme of the present utility model is: a level with magnetic device, including a case body and a bubble cell on the case body, the cross section of the bottom of the case body, being the location of the reference plane, has a profiled shape, and furthermore by this is constituted a profiled slot on the bottom of the case body, a magnet is placed inside the profiled slot on the bottom of said case body, an elastic retaining bracket is pressed on top of the magnet, and the shapes of that elastic retaining bracket and the profiled slot are complementarily matched.

The cross section of said profiled slot is a shape being narrow above and broad below, the magnet is placed in the comparatively broad place of the base, and the elastic retaining bracket is pressed onto a position between the comparatively narrow place of the base and the magnet.

The cross section of said profiled slot is a shape being narrow below and broad above, the magnet is placed in the comparatively narrow place of the base, the elastic retaining bracket is pressed into the comparatively broad place of the base, and a spacer is placed on the inner wall of the case body above the elastic retaining bracket.

Recesses are opened on the surface of the bottom of said case body so that the inner wall of the case body forms a raised rib, and furthermore by this is formed two profiled slots being narrow above and broad below, magnets are placed respectively in the comparatively broad place of the base of each profiled slot, the elastic retaining bracket has a bridge shape and straddles the raised rib, and furthermore it is pressed on top of the two magnets on the left and right. Glue is applied on the positions where the magnet and the elastic retaining bracket are set.

In a level with magnetic device designed according to the technological scheme of the present utility model, the cross section of the bottom of the case body, being the location of the reference plane, has a profiled shape, and furthermore by this is constituted a profiled slot on the bottom of the case body, a magnet is placed inside the profiled slot on the bottom of the case body, and an elastic retaining bracket is pressed on top of the magnet, whereby the magnet positioned inside the profiled slot and the elastic retaining bracket are fixed in position. The magnetic device on the present level cannot influence the precision of the product, and at the same time, it has superior points of simplicity of structure and pleasantness of external appearance.

DESCRIPTION OF THE DRAWINGS

FIG. 1: Elevation view of a level according to one embodiment of the present invention;

FIG. 2: Sectional view of the level shown in FIG. 1 taken along lines 2-2 of FIG. 1;

FIG. 3: Elevation view similar to that of FIG. 1 illustrating a level according to another embodiment of the present invention;

FIG. 4: Sectional view of the level shown in FIG. 3 taken along lines 4-4 of FIG. 3; and FIG. 5: Sectional view similar to FIGS. 2 and 4 illustrating a level according to another embodiment of the present invention.

DETAILED DESCRIPTION OF THE INVENTION

One embodiment of the invention will be described in detail with respect to FIG. 1 and FIG. 2.

A level with magnetic device includes a case body 2 and a bubble cell 1 formed in the case body 2. A profiled slot is formed in the bottom of the case body 2. A magnet 4 is placed inside the profiled slot on the bottom of the case body 2. As best shown in FIG. 2, the profiled slot (not numbered) is formed axially along the bottom of the case body 2 and, in this regard, is formed entirely within the interior volume (not numbered) defined by the case body 2. As such, when magnet 4 is situated within the slot, the magnet 4 is disposed within the cavity body 2. An elastic retaining bracket 3 is pressed on top of the magnet 4 and the magnet 4 is placed in the comparatively broad 7 place of the base. The elastic retaining bracket 4 is pressed onto a position between the comparatively narrow 6 place of the base and the magnet 4. A spacer 5 is placed on the inner wall of the case body 2 above the elastic retaining bracket 3, and said spacer is an elastic clip. During installation, the magnet 4 and the elastic retaining bracket 3 are installed together from one side of the case body 2, and because the shape of the profiled slot on the bottom of the case body 2 is narrow above 6 and broad below 6 and by the action of the spacer 5, the magnet 3 and the elastic retaining bracket 4 are fixed in position. Before installing the bubble cell 1, glass glue may be deposited from the place where the bubble cell is wedged into the slot, so that the positions of the magnet 4 and the elastic retaining bracket 3 are further fixed.

Another embodiment of the invention is described in detail with respect to FIG. 3 and FIG. 4.

A level with magnetic device includes a case body 8 and a bubble cell 9 formed in the case body 8, and the cross sectional shape of the bottom of the case body 8 is narrow above 10 and broad below 11. Recesses 12 are opened on the surface of the bottom of the case body 8 so that the inner wall on the bottom of the case body forms a raised rib 13, and furthermore by this is formed two profiled slots being narrow above 10 and broad below 11. A magnet 14 and a magnet 15 are placed respectively in the comparatively broad place of the base of each profiled slot. The elastic retaining bracket 16 has a bridge shape and straddles the raised rib 13, and furthermore it is pressed on top of the magnet 14 and the magnet 15. The magnet 14 and the magnet 15 are placed in the comparatively broad place 11 of the base, and the elastic retaining bracket 16 is pressed onto a position between the comparatively narrow place 10 of the base and the magnets 14, 15. During installation, the magnet 14, the magnet 15, and the elastic retaining bracket 16 are installed together from one side of the case body 8, and since the shape of the profiled slot on the bottom of the case body 8 is narrow above 10 and broad below 11, the magnet 14, the magnet 15, and the elastic retaining bracket 16 are fixed in position. Before installing the bubble cell 9, one can pour in glass glue from the place where the bubble cell 9 is wedged into the slot, so that the positions of the magnet 14, the magnet 15, and the elastic retaining bracket 16 are further fixed.

Another embodiment of the present invention will now be described in detail together with respect to FIG. 5. Similar to the embodiments described with respect to FIGS. 1-4, the level has a magnetic device and further includes a case body 17 and a bubble cell 18 formed in the case body 17. The cross sectional shape of the bottom of the case body 17 is narrow below 19 and broad above 20. Furthermore by this is constituted a profiled slot that is narrow below 19 and broad above 20.

A magnet 21 is placed inside the profiled slot at the bottom of the case body 17 and an elastic retaining bracket 22 is pressed on top of the magnet 21. The magnet 21 is placed in the comparatively narrow place 19 of the base, and the elastic retaining bracket 22 is pressed in the comparatively broad place 20 of the base. A spacer 23 is placed on the inner wall of the case body 17 above the elastic retaining bracket 22. In one embodiment, the spacer 23 is an elastic clip. During installation, the magnet 21 and the elastic retaining bracket 22 are installed together from the left side of the case body 17, and by the action of the spacer 23, the magnet 21 and the elastic retaining bracket 22 are fixed in position. Before installing the bubble cell 18, one can pour in glass glue from the place where the bubble cell 18 is wedged into the slot, so that the positions of the magnet 21 and the elastic retaining bracket 22 are further fixed.

The invention claimed is:

1. A level comprising:
   an elongated body defined by a first and a second pair of spaced walls, the first pair of walls extending parallel to a reference plane and the second pair of walls generally normal to the first pair of walls, and wherein an opening is defined in at least one of the walls of the second pair of walls;
   an internal cavity defined by the elongated body;
   an orientation indicating device carried within the internal cavity and aligned with the opening;
   an elongated groove extending along the length of one of the walls of the first pair of walls, wherein the elongated groove extends inwardly toward the internal cavity such that a pair of slots spaced from one another are defined against an interior surface of the wall of the first pair of walls; and
   a magnet arrangement positioned in the pair of slots such that the magnet arrangement is spaced from the reference plane adjacent the magnet arrangement by the wall of the first pair of walls.

2. The level of claim 1 further comprising an elastic retaining member disposed in the internal cavity and biasing the magnet arrangement against the interior surface of the wall of the first pair of walls.

3. The level of claim 2 wherein the elastic retaining member includes a first leg and a second leg spaced from the first leg by a bridge member, and wherein the first leg is retained in a first slot and the second leg is retained in a second slot.

4. The level of claim 1 wherein the elongated groove is shaped such that the one wall of the first pair of walls mates against a cornered reference frame.

5. The level of claim 1 wherein the groove is centered along the length of the one wall.

6. A level for determining an orientation of a reference plane, comprising:
   an elongated member having an internal cavity and an opening to the internal cavity, the elongated member having a top wall and a bottom wall spaced from and generally parallel to the top wall;
   an orientation indicating member positioned within the internal cavity and viewable through the opening; and
   a magnet retained against an inner surface of the bottom wall, wherein the inner surface is adjacent the internal cavity such that the magnet is spaced from the reference plane by the bottom wall when the bottom wall is placed onto the reference plane.

7. The level of claim 6 wherein the bottom wall has an indentation forming a raised portion in the inner surface such that a pair of slots are defined along the inner surface adjacent the raised portion.

8. The level of claim 7 further comprising a clip configured to bias the magnet within the pair of slots.

9. The level of claim 8 wherein the clip has a first leg and a second leg interconnected by a bridge, wherein the first leg extends into a first slot, the second leg extends into a second slot opposite the first slot, and the bridge seats against the raised portion in the inner surface of the bottom wall.

10. The level of claim 6 further comprising a notch formed in the top wall and further comprising a second orientation indicating member retained in the notch.

11. The level of claim 6 wherein the elongated member is further defined by a first sidewall and a second sidewall spaced from the first sidewall, and wherein the first and the second sidewalls are interconnected between the top and bottom walls, and wherein the bottom wall has a width that exceeds the spacing between the first and the second sidewalls.

12. The level of claim 11 wherein the top wall has a width that exceeds the spacing between the first and the second sidewall.

* * * * *

UNITED STATES PATENT AND TRADEMARK OFFICE
CERTIFICATE OF CORRECTION

PATENT NO. : 7,802,371 B2  Page 1 of 1
APPLICATION NO. : 12/172437
DATED : September 28, 2010
INVENTOR(S) : Wu Dong Ming It is certified that error appears in the above-identified patent and that said Letters Patent is hereby corrected as shown below:

Title Page item 63

Please add the following:

-- This application is a continuation of application Serial No. 11/350,204, filed February 8, 2006, now U.S. Patent 7,398,600, issued July 15, 2008. --

Signed and Sealed this

Twenty-third Day of November, 2010

David J. Kappos
*Director of the United States Patent and Trademark Office*